O. E. MICHAUD.
ROLLER BEARING.
APPLICATION FILED OCT. 5, 1908.
939,056.
Patented Nov. 2, 1909.
2 SHEETS—SHEET 1.
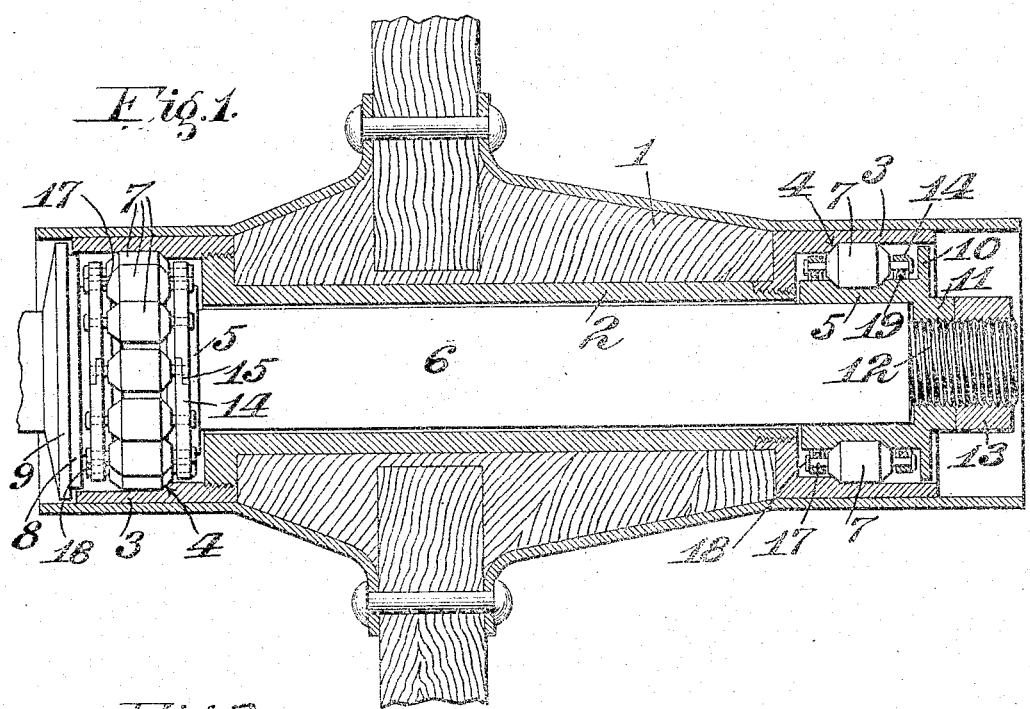
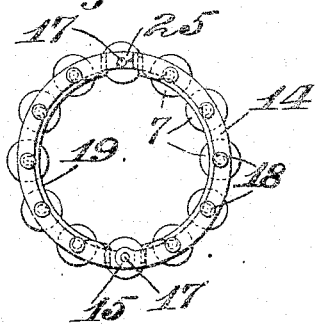
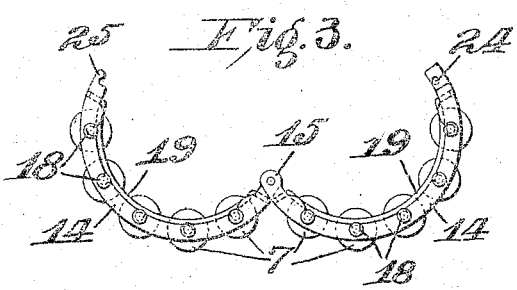
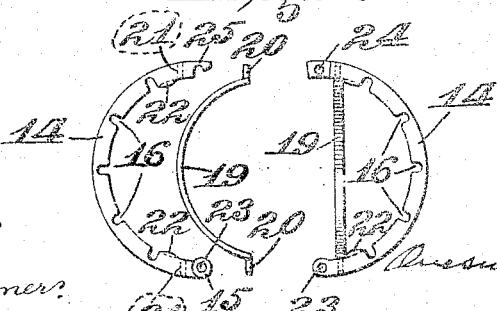
Witnesses:
Edgar T. Farmer
G. A. Pennington
Inventor:
Oresime E. Michaud,
By Carr & Carr, Attys.

O. E. MICHAUD.
ROLLER BEARING.
APPLICATION FILED OCT. 5, 1908.
939,056.
Patented Nov. 2, 1909.
2 SHEETS—SHEET 2.
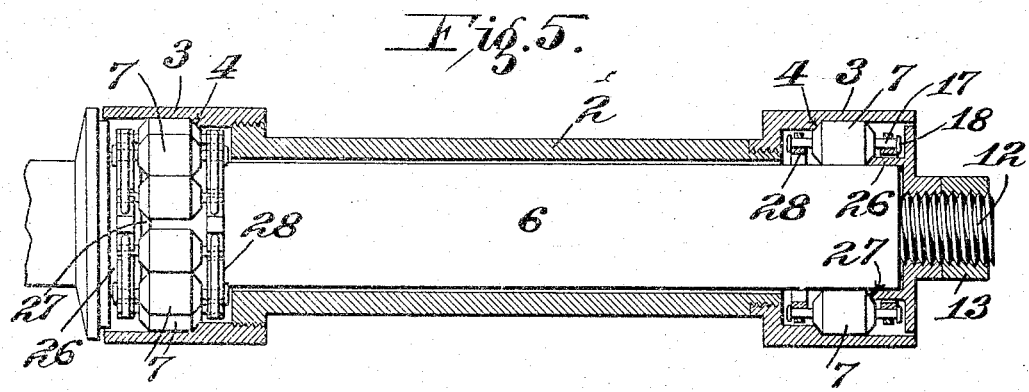
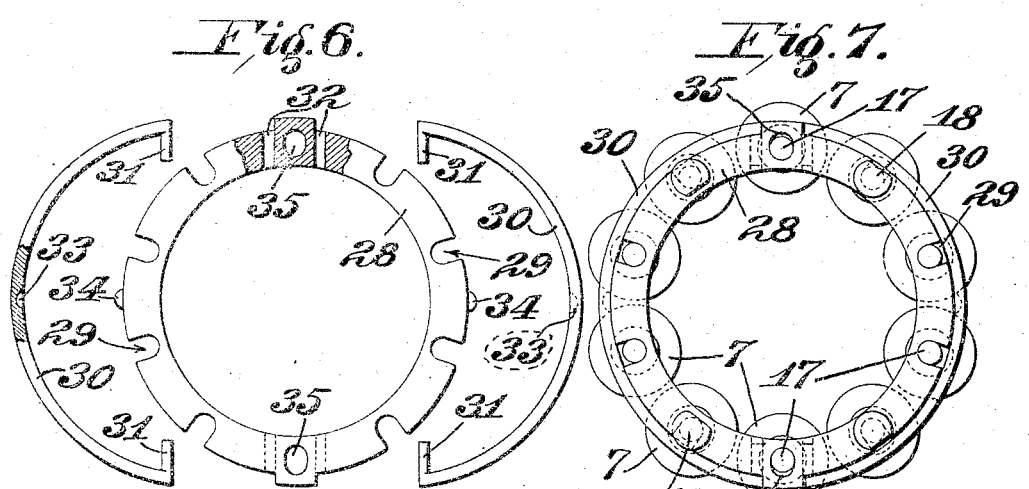
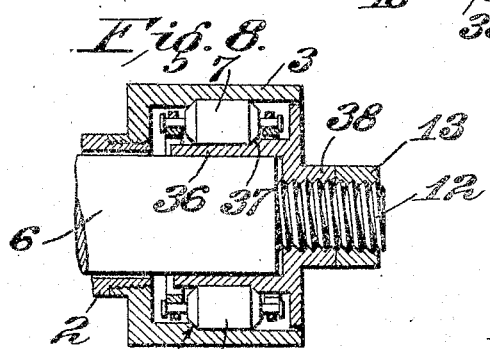
Witnesses:
Edgar T. Farmer
G. A. Pennington
Inventor:
Onesime E. Michaud,
By Carr & Carr,
Attys.

UNITED STATES PATENT OFFICE.

ONESIME E. MICHAUD, OF ST. LOUIS, MISSOURI.

ROLLER-BEARING.

939,056. Specification of Letters Patent. Patented Nov. 2, 1909.

Application filed October 5, 1908. Serial No. 456,171.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to roller bearings, and has for its principal objects to secure endwise adjustment and to take up end play or looseness of the bearings, to facilitate the assembling of the parts of the bearings, to retain the rollers in position on the spacing rings, and to attain certain advantages hereinafter more fully appearing.

The invention consists in the parts and in the arrangement and combination of parts hereinafter described and claimed.

In the accompanying drawings forming part of this specification, and wherein like symbols refer to like parts wherever they occur, Figure 1 is a longitudinal section through a wheel hub equipped with roller bearings embodying my invention; Fig. 2 is a side elevation of a divided spacing ring in closed position and showing a series of rollers thereon; Fig. 3 is a similar view, but showing the ring in open position; Fig. 4 is a detail view of the parts of the ring detached; Fig. 5 is a longitudinal section of the hub spindle sleeve equipped with a modification of my roller bearing; Fig. 6 is an enlarged side elevation partly in section showing parts of a modification with the spacing ring detached; Fig. 7 is a side elevation showing the series of rollers in position on the ring and the retaining members in place; and, Fig. 8 is a sectional view of a further modification of the bearing.

Referring now more particularly to Sheet No. 1 of the drawings, the wheel hub 1 is provided with a spindle sleeve 2. This sleeve has at each end an enlarged bearing ring portion 3. The inner bearing faces of these ring portions 3 are counterbored to provide beveled shoulders 4 thereon.

The inner bearing sleeves or rings 5 are movably fitted on the axle 6. These inner bearing rings are provided with annular grooves having beveled side walls. The grooves are counterparts of rollers 7 which have chamfered or beveled portions.

The inner bearing ring 5 for the roller bearing at the inner end of the hub 1 is slidably sleeved on the axle and it is preferably provided with an annular flanged portion 8 at one end so as to bear flatwise against a collar or annular shoulder 9 on the axle 6. The inner bearing ring 5 for the roller bearing at the outer end of the hub 1 is also slidably sleeved on the axle and it is provided with a guard flange 10 at its outer end. This ring is provided with a screw threaded nut portion 11 which is adapted to be fitted upon the threaded end portion 12 of the axle. A jam nut 13 is provided to lock the bearing ring in its adjusted position.

By the construction herein set forth, the bearing may be adjusted so that the inner beveled end portions of the rollers bear against the beveled shoulders 4 on the outer bearing rings 3, thereby taking up all end play or looseness. This adjustment may be readily effected by merely adjusting the inner bearing ring 5 on the outer end of the axle.

In order to keep the antifriction rollers 7 properly spaced, spacing rings 14 are employed, and to facilitate assembling the rollers on the rings, they are divided and preferably hinged as at 15. The spacing ring sections are notched on their inner sides as at 16 to receive the spindle portions 17 on the ends of the rollers 7. The ends of some of the roller spindles are provided with flanged heads or enlargements 18 which hold the spacing rings from spreading away from the rollers when in position therein. These heads may be provided on all the roller spindles except those on the two rollers located at the joints of the two ring sections, if desired, but it is only necessary to provide them on two or more rollers located at diametrically or diagonally opposite points.

In order to retain the rollers in place when the rings are detached from the inner bearing rings 5, curved resilient retaining members 19 are provided. These are approximately half circles and they are provided with pivot studs or projections 20 which are adapted to fit in holes 21 provided therefor in the spacing ring sections. When it is desired to place the rollers on the ring sections it is only necessary to turn the retaining member 19 at right angles or a quarter turn or more to the ring section and then drop the roller spindles into the notches 16. The retaining member may then be turned back into position to close the open notches. By this arrangement, the rollers may also be readily removed.

In order to guard against accidental displacement of the retaining members when in effective position it is preferable to provide small rounded ears or projections 22 on the inner faces of the ring sections 14 at the side edges thereof and near the pivot holes 21, so as to lie outside of the retaining members. In moving the retaining members into and out of effective position they will yield sufficiently to allow them to ride over said rounded projections.

The hinge ends of the ring sections 14 are rounded and cut away from opposite sides and made to overlap. These overlapping portions are provided with registering holes 23 which receive plain end spindles of a roller and thus constitute a hinge joint when the parts are assembled. The opposite end of one ring section is provided with a hole 24 and the coöperating end of the companion ring section is cut away to form a recessed hook portion 25. The plain spindle of a roller is projected through the hole 24 and the ring sections are brought together until the hooked end 25 snaps over the projecting end of the spindle.

If desired, the ring sections may be notched from the outside and the retaining members may be placed around the periphery thereof as shown in Figs. 6 and 7.

In the modification illustrated in Fig. 5 the inner bearing rings 5 are dispensed with and the rollers bear directly upon the cylindrical end portions of the axle. In this modification, the inner ring members 26 constitute end thrust bearings and they are beveled on the inner ends as at 27 to correspond to the beveled end portions of the rollers. The spacing rings for this arrangement of roller bearing may be of a single or solid piece 28 and provided with peripheral notches 29 for the roller spindles. The retaining members 30 are provided with inturned pivot studs 31 which are adapted to fit holes 32 in the ring 28 in a manner similar to the hereinbefore mentioned retaining members 19, and in order to prevent accidental displacement of the retaining members they are provided with depressions 33 which are arranged to fit over rounded raised portions 34 on the periphery of the ring 28. At diametrically opposite points on the ring and between the pivot holes 32 are bearing holes 35 for the plain roller spindles. As shown in Fig. 7, flanged enlargements or heads 18 are provided only on each of two rollers on opposite sides of the ring. A segment of these flanges is preferably cut away tangentially of the spindles so that the rollers may be turned as shown to the right hand side of Fig. 7 in order to swing the retaining member 29 off of the periphery of the spacing ring.

By the constructions and arrangements of the spacing rings herein set forth the rollers may be easily assembled thereon, and the bearings may also be readily taken apart whenever it is so desired.

In Fig. 8, an inner bearing ring or sleeve 36 is provided for the rollers. This ring has a beveled shoulder 37 corresponding to the shoulder 27 on the end thrust ring 26. The arrangement of the ring is the same at each end of the wheel hub, except that the ring at the outer end is provided with a screw-threaded nut portion 38.

Obviously, the devices admit of considerable modification without departing from my invention. Therefore, I do not wish to be limited to the constructions and arrangements shown.

What I claim as my invention and desire to secure by Letters Patent is:

1. The combination with an axle, of a wheel hub rotatably mounted thereon, said hub having bearing rings in each end, and each of said bearing rings having an internal annular beveled end thrust shoulder near its inner end, an inner bearing ring sleeved on said axle and in coöperative relation to the bearing ring in the inner end of said hub and having a beveled end thrust shoulder diagonally opposite to the shoulder on said hub bearing ring, a stop on said axle adapted to bear against the outer end of said axle bearing ring, a bearing ring adjustably mounted on said axle endwise thereof in coöperative relation to the bearing ring in the outer end of said hub and having a beveled end thrust shoulder diagonally opposite to the shoulder on said last mentioned hub bearing ring, and a series of cylindrical rollers interposed between the bearing rings at each end of said hub in rolling contact therewith, said rollers having beveled end portions corresponding to the bevel of said end thrust shoulders.

2. A roller bearing comprising a bearing sleeve having an annular peripheral groove, a series of rollers arranged to travel in said groove and having axial spindles at each end, and companion spacing rings for said series of rollers, each of said rings having a series of spaced notches in the circular faces thereof adapted to receive the ends of said roller spindles, and semicircular retaining members movably mounted on said spacing rings and arranged to close the open ends of said notches.

3. A roller bearing comprising a peripherally grooved bearing sleeve, a series of rollers arranged to travel in said groove, and having axial end spindles some of which are provided with enlargements at their outer ends, companion divided spacing rings for said rollers, each of said spacing rings comprising two half sections hingedly connected together at one end and having means for releasably connecting their opposite ends, and each of said half sections having spaced notches in their circular faces for the end spindles of said rollers.

4. A spacing ring for roller bearings comprising a ring having notches in its circular face arranged to receive end spindles of the bearing rollers, and movable retaining members secured on said spacing ring, said members being arranged to conform to the curvature of said ring and adapted to close the open ends of said notches, substantially as and for the purpose specified.

5. A spacing ring for roller bearings having notches in its circular face arranged to receive end spindles of the bearing rollers, and retaining members arranged to conform to the curvature of said ring and adapted to close the open ends of said notches, said retaining members being hingedly and detachably mounted on said ring, substantially as and for the purpose specified.

Signed at St. Louis, Missouri, this 3rd day of October, 1908.

ONESIME E. MICHAUD.

Witnesses:
G. A. PENNINGTON,
J. B. MEGOWN.